(12) United States Patent
Chun

(10) Patent No.: US 7,477,252 B2
(45) Date of Patent: Jan. 13, 2009

(54) PROCESSING THREE DIMENSIONAL DATA FOR SPATIAL THREE DIMENSIONAL DISPLAYS

(75) Inventor: Won Chun, Cambridge, MA (US)

(73) Assignee: Actuality Systems, Inc., Bedford, MA (US)

(*) Notice: Subject to any disclaimer, the term of this patent is extended or adjusted under 35 U.S.C. 154(b) by 301 days.

(21) Appl. No.: 11/098,943

(22) Filed: Apr. 5, 2005

(65) Prior Publication Data
US 2005/0219241 A1    Oct. 6, 2005

Related U.S. Application Data

(60) Provisional application No. 60/565,388, filed on Apr. 26, 2004, provisional application No. 60/559,753, filed on Apr. 5, 2004.

(51) Int. Cl.
G09G 3/00 (2006.01)
G09G 5/02 (2006.01)
G09G 5/00 (2006.01)
G09G 5/10 (2006.01)
G06T 1/00 (2006.01)
G06T 15/10 (2006.01)
G06T 15/20 (2006.01)

(52) U.S. Cl. .......... 345/427; 345/31; 345/600; 345/629; 345/672; 345/690

(58) Field of Classification Search .......... 345/31, 345/600, 629, 672, 690, 427
See application file for complete search history.

(56) References Cited

U.S. PATENT DOCUMENTS

| | | | |
|---|---|---|---|
| 2,967,905 A | 1/1961 | Hirsch | |
| 3,140,415 A | 7/1964 | Ketchpel | |
| 4,160,973 A * | 7/1979 | Berlin, Jr. | 345/31 |
| 5,148,310 A * | 9/1992 | Batchko | 359/479 |
| 5,742,331 A * | 4/1998 | Uomori et al. | 348/51 |
| 5,761,394 A * | 6/1998 | Sugiura et al. | 358/1.9 |
| 5,815,314 A * | 9/1998 | Sudo | 359/472 |
| 5,822,451 A * | 10/1998 | Spaulding et al. | 382/162 |
| 6,100,862 A | 8/2000 | Sullivan | |
| 6,183,088 B1 * | 2/2001 | LoRe et al. | 353/7 |
| 6,554,430 B2 | 4/2003 | Dorval et al. | |
| 2001/0045920 A1 * | 11/2001 | Hall et al. | 345/32 |
| 2003/0085891 A1 * | 5/2003 | Lyons et al. | 345/420 |
| 2003/0086614 A1 * | 5/2003 | Shen et al. | 382/199 |
| 2003/0123070 A1 * | 7/2003 | Weiner | 358/1.9 |
| 2005/0180007 A1 * | 8/2005 | Cossairt et al. | 359/465 |

(Continued)

OTHER PUBLICATIONS

Foley, James D.; van Dam, Andries; Feiner, Steven k.; Hughes, John F.; "Computer Graphics Principles and Practice;" 1996, Addison-Wesley Publishing Company; Second Edition; pp. 210-226.*

*Primary Examiner*—Ulka Chauhan
*Assistant Examiner*—Crystal Murdoch
(74) *Attorney, Agent, or Firm*—Fish & Richardson P.C.

(57) ABSTRACT

A three dimensional image is displayed by providing initial data corresponding to the three dimensional image, generating a plurality of sets of data from the initial data, each set of data corresponding to an intersection of the three dimensional image with a surface, and displaying the three dimensional image using a three dimensional display based on the sets of data. A data processor is used to operate on the sets of data to re-center the three dimensional image.

28 Claims, 10 Drawing Sheets

U.S. PATENT DOCUMENTS

| | | | |
|---|---|---|---|
| 2005/0206643 A1* | 9/2005 | Endoh et al. | 345/428 |
| 2006/0017586 A1* | 1/2006 | Suzuki et al. | 340/815.4 |
| 2006/0125822 A1* | 6/2006 | Kurtenbach et al. | 345/419 |
| 2008/0008076 A1* | 1/2008 | Raguin et al. | 369/103 |

* cited by examiner

PROCESSING THREE DIMENSIONAL DATA FOR SPATIAL THREE DIMENSIONAL DISPLAYS

RELATED APPLICATION

Under 35 USC §119(e)(1), this application claims the benefit of prior U.S. provisional applications 60/559,753, filed Apr. 5, 2004 and 60/565,388, filed Apr. 26, 2004. Both of these applications are incorporated herein by reference in their entirety.

TECHNICAL FIELD

This invention relates to electronic display technology, and more particularly to processing image data for volumetric three-dimensional (hereinafter "3-D") displays.

BACKGROUND

There are many types of 3-D displays, such as volumetric displays whose imagery occupies a real 3-D volume. Some volumetric displays are multiplanar, that is, the imagery is composed of an aggregate of surfaces. Many embodiments of multiplanar 3-D displays produce 3-D imagery by illuminating a projection screen undergoing periodic motion. One example of a projection screen for generating a 3-D image is shown in FIG. 1. In operation, projection screen 5 rotates about axis 10 (or "sweeps") through a 3-D display volume 15. A light source and optical projection system (not shown) are used to generate images on surfaces 20 or 25 of projection screen 5 as it rotates. Since different images are projected onto the screen 5 as it rotates, the images, coupled with the persistence of human vision, cause a volume-filling (or "volumetric") 3-D image 30 to be perceived by a viewer as projection screen 5 rotates.

SUMMARY

In general, in one aspect, a method includes providing initial data corresponding to an image projected by a three dimensional display. The method also includes generating a plurality of sets of data from the initial data. Each set of data corresponds to an intersection of the three dimensional image of the object with a surface. The method also includes displaying the three dimensional image of the object using a three dimensional display based on the sets of data.

Preferred embodiments may include one or more of the following features. The surface can be a two-dimensional surface. The two-dimensional surfaces used to generate the plurality of sets of data can intersect at a common axis. The method can include calibrating the sets of data based on calibration information associated with the three dimensional display. The calibration can reduce a distortion of the three dimensional image introduced by the three dimensional display. Calibrating the sets of data can include performing a linear transform on the initial data to reduce the effect of distortion.

The method can also include operating on the sets of data to re-center the three dimensional image. The operation to re-center the three-dimensional image can include performing a linear transform on the initial data based on information provided by a user of the three-dimensional display. The method can also include operating on the sets of data to re-orient the three-dimensional image. The operation to re-orient the three-dimensional image can include performing a linear transform operation on the first set of data based information provided by a user of the three-dimensional display. The method can also include operating on the sets of data to re-scale the three-dimensional image. The operation to re-scale the three-dimensional image can include performing a linear transform on the initial data based on information provided by a user of the three-dimensional display.

Generating the plurality of sets of data can include converting a color for a particular pixel from an initial format to a display format. Converting the color can include reducing a number of bits representing a color for the particular pixel in the sets of data relative to a number of bits representing a color for the pixel in the initial data. Reducing the number of bits representing the color can include converting the color for the particular pixel from a multi-bit representation to a single bit representation. Converting the color can include shifting a most significant bit of the plurality of bits into a buffer and performing a threshold analysis on the most significant bit. Generating the sets of data can include generating the sets of data using a general processing unit. The general processing unit can include a video card.

The method can also include superimposing a second image on the displayed three-dimensional image of using the three dimensional display. The second image can be a three-dimensional image. The second image can be a three-dimensional image of the same object based on data from a source different from the source of the initial data. The second image can also be a three-dimensional image same object as the image displayed three-dimensional image, the second image can be generated based on a different set of initial data. The second image can be a computer-generated icon.

The method can also include operating on the sets of data to re-color at least a portion of the three dimensional image. The method can also include adjusting the three-dimensional image in real time based on information provided by a user of the three-dimensional display.

In general, in one aspect, a method includes providing initial data corresponding to a three dimensional image projected by a three dimensional display and generating a plurality of sets of data based on the initial data. Each set of data corresponds to an intersection a two dimensional surface with the three dimensional image. The method includes comparing each set of data to a corresponding threshold data structure. Each threshold data structure can be generated based on a threshold data structure corresponding to an adjacent data set, where the adjacent data set is the data set corresponding to the adjacent intersection of the two dimensional surface with the three dimensional image.

Preferred embodiments may include one or more of the following features

Each threshold data structure can include a matrix of threshold values. A first of the threshold data structures can be generated by performing a permutation and negation the matrix elements of the threshold data structure for the adjacent data set. Each set of data can include a plurality of elements corresponding to pixels in the three dimensional image, and comparing each set of data to the corresponding threshold data structure can include determining if a value for a particular pixel in the data set is greater than a value associated with the particular pixel in the associated threshold data structure.

In general, in one aspect, a method includes sequentially generating a plurality of sets of data, each set corresponding to an intersection of an image projected by a three dimensional display with a two dimensional surface. The method includes sequentially projecting images onto a rotating screen to render a three dimensional image of the object. Each projected image can be produced based on a corresponding set of data. The sequence in which the images are projected can be different from the sequence in which the sets of data are generated.

Preferred embodiments may include one or more of the following features. Projecting the images can include projecting the plurality of sets of data in a sequential order for sets of data that represent adjacent sets of data in the three dimensional image of the object.

Aspects of the invention can provide one or more of the following advantages. In one aspect, the system and algorithms can perform efficient data processing to generate 3-D imagery. In an additional aspect, the system allows an operator to manipulate the displayed image thereby improving the versatility of the display. In an additional aspect, the system enables a user to superimpose a second 3-D image onto a first projected 3-D image providing the advantage of allowing a user to view disparate types of data or allowing a user to point out a particular portion of the image. In an additional aspect, portions of the image can be re-colored or highlighted providing the advantage of allowing a particular feature to be clearly distinguished from other portions of the image. In an additional aspect, a dither kernel can be rotated for adjacent slices providing the advantage of comparing the pixels in adjacent slices to different threshold values. In an additional aspect, the data slices can be rendered in a non-sequential order to provide the advantage of allowing a user to view and manipulate a low-resolution image of full object before all of the data slices are generated and uploaded to the display.

DETAILED DESCRIPTION

In general, the systems and methods described herein may be used to transform initial image data into a format that is appropriate for a corresponding type of electronic display, including 2-D and 3-D displays, such as, for example, holographic video displays, multi-view displays, or multiplanar (or other) volumetric displays. For example, the system and methods can be used to convert data acquired using conventional medical imaging technologies (e.g., magnetic resonance imaging (MRI), positron emission tomography (PET), and computed axial tomography (CAT)), geological imaging technologies, and/or images generated using computer-aided drawing (CAD) technologies into an appropriate format to generate a 3-D image of the data on the display.

Embodiments of the systems and methods allow an operator to manipulate the displayed image, for example, in real time, improving the versatility and value of the display. As an example, the systems and methods can enable a user of a 3-D display not only to take data from a conventional data source, but to manipulate the image in real time to provide enhanced visualization of one or more features of the image. For example, embodiments of the systems and methods enable a user to re-center, re-orient, or re-scale the displayed image. Such operations allow the user to view a desired portion of the object in a desired size and orientation. In addition to re-centering, re-orienting, or re-scaling the image, other manipulations are possible. For example, portions of the image can be re-colored or highlighted such that a particular feature can be clearly distinguished from other portions of the image.

Embodiments also enable a user to superimpose a second 3-D image onto a first projected 3-D image. For example, a display system can project a computer generated icon (e.g., a computer generate pointer) in addition to the 3-D image generated from the initial image data. This allows a user to interact with the displayed image, for example, to point out various portions of the displayed image using a visible indicator that is projected onto the 3-D image. In another example, a displayed image can incorporate multiple sets of initial image data, effectively projecting images corresponding to the different initial image data concurrently. For example, in medical imaging applications, the systems and methods can be used to concurrently display both fused images from different sources (e.g., fusing images from a CAT scan and a PET scan of the same organ)

Figure 1:
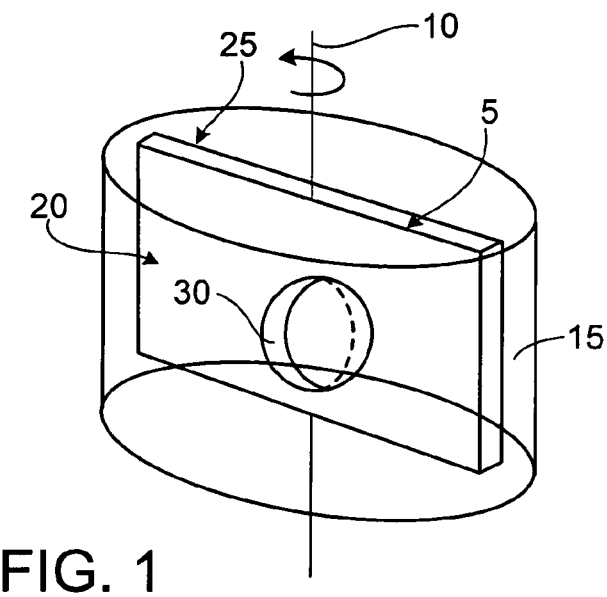
FIG. 1 is a perspective view of a volumetric display.
Figure 2:
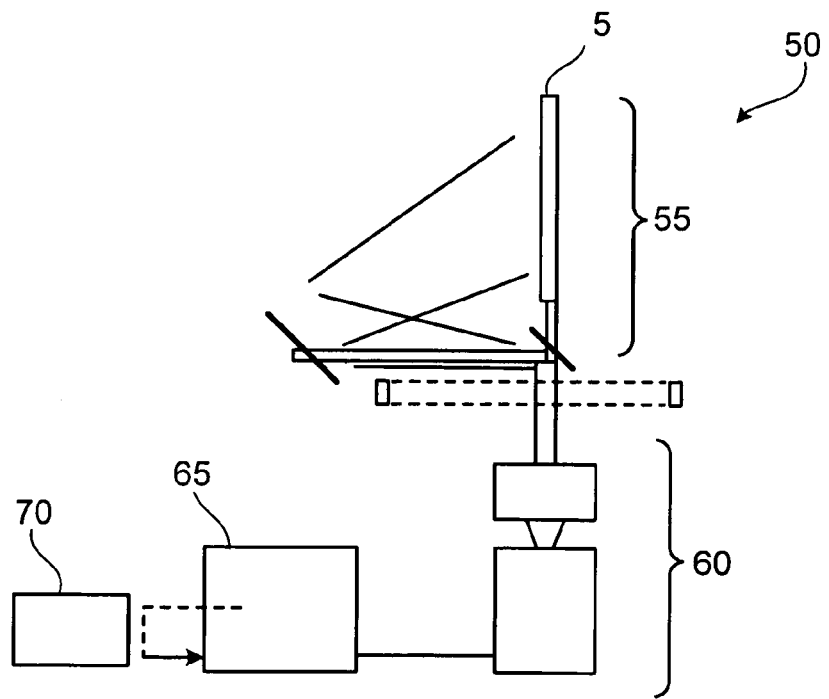
FIG. 2 is a block diagram of a display system.

Referring now to FIG. 2, an embodiment of a volumetric 3-D display system includes four basic components: a screen assembly 55, projection optics 60, control electronics 65, and a data source 70. Data source 70 may be external (such as a computer or a data stream) or internal (such as imagery created by data already in the 3-D display system). Control electronics 65, which includes memory, processor, and timing signal reception and generation, operate on data source 70. Control electronics 65 perform operations on data and create drive signals for projection optics 60. Data operations may include rotating projected images in coordination with the rotation of screen assembly 55 to compensate for rotation differences between screen assembly 55 and projection optics 60.

In order to generate a 3-D image, initial image data is divided into multiple sets of data (also referred to below as slices of data), each corresponding to a two-dimensional section of the 3-D image, and each set of data is projected onto screen 5 when the screen is at a particular position or rotation. A commercially-available example that operates in this fashion is the Perspecta® Spatial 3-D Display (from Actuality Systems, Inc., Burlington, Mass.). Furthermore, additional embodiments of such displays are described in U.S. Pat. No. 6,554,430, the entire contents of which are hereby incorporated by reference.

Figure 3:
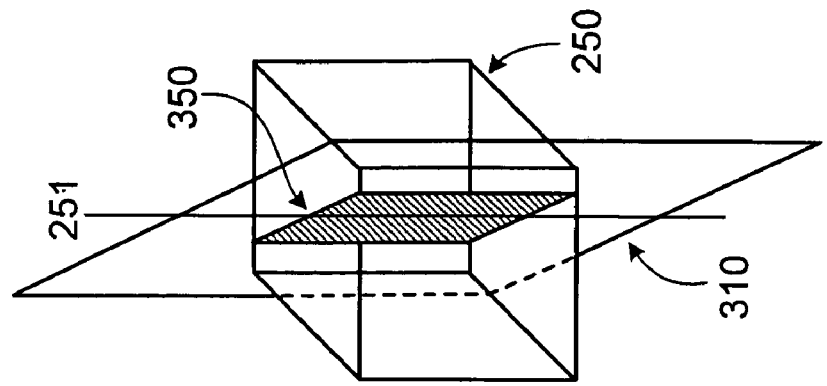
FIG. 3 is an intersection of an exemplary 3-D image of an object with a 2-D surface.
Figure 3:
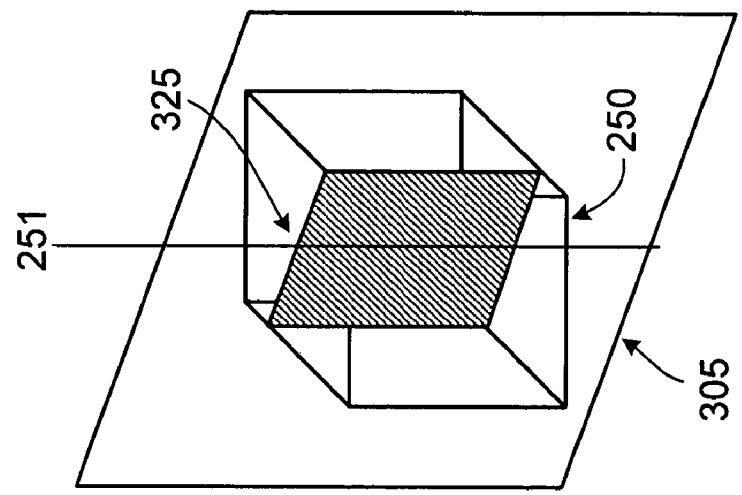
Figure 3:
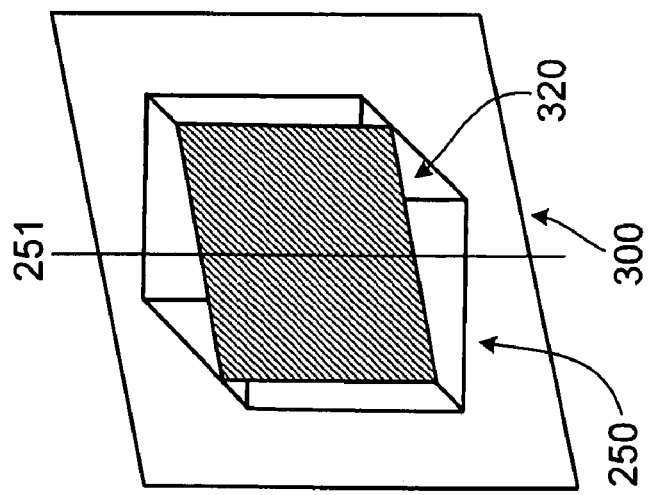

As shown in FIG. 3, in order to form a 3-D image, multiple 2-D slices are projected onto screen assembly 55 to compose a 3-D volume. Since a fixed projector and a rotating screen are used to sweep out a 3-D volume, the contents of these 2-D slices (e.g., slices 320, 325, and 350) are computed based on image data for the 3-D object 250. In order to generate the 2-D slices 320, 325, and 350, an algorithm is executed to slice an image volume for the 3-D object 250 into 2-D slices 320, 325, and 350 and format the 2-D slices to be uploaded to the display. In some embodiments, the algorithm can be executed by a graphics processing unit (GPU) (e.g., a video card). Commercially-available GPUs are available, for example, from NVIDIA, Inc., California.

More specifically, the GPU maps a 2-D surface (e.g., a polygon) to a surface specified in the image space of the 3-D image data based on vertex coordinates of the 3-D data. Each of the 2-D surfaces intersect at a common axis 251. The mapping between the image data and the contents of the 2-D slice should mimic the mapping from the projected slice in the display into real space. For example, a plane (300, 305, 310) intersects the image data (250, 250, 250) resulting in an intersection (320, 325, 330). In some embodiments, a host computer, running software for visualization of, e.g., medical imaging data, uses a video card to transform the data for rapid and interactive display in a volumetric three-dimensional display.

Figure 4:
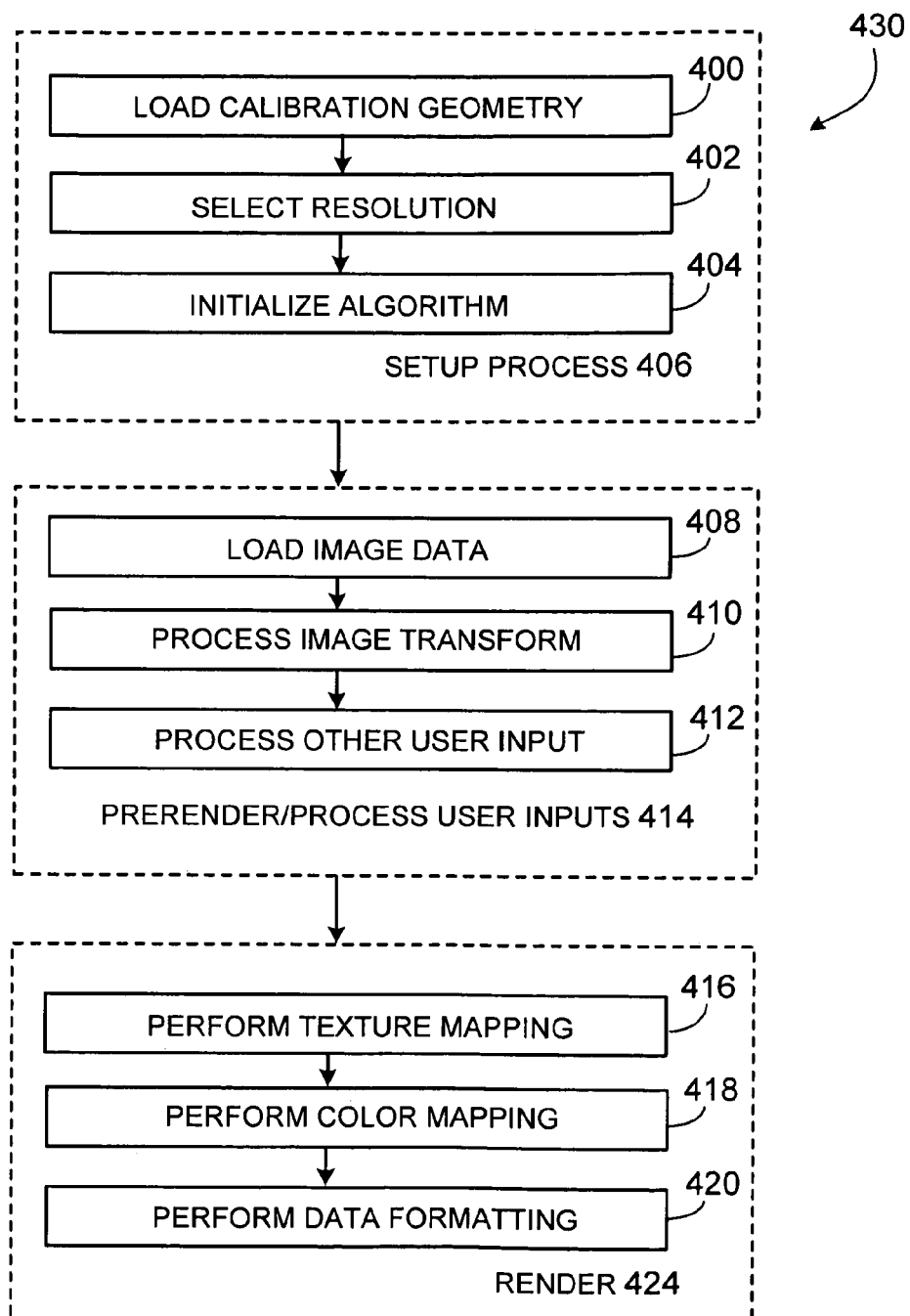
FIG. 4 is a flow chart of a volumetric rendering process.

FIG. 4 shows a flow chart of a volumetric rendering process 430 used to generate a 3-D volumetric image. Process 430 includes a setup process 406 that initializes the system, a pre-rendering process 414 that processes user inputs, and a rendering process 424 that generates 2-D data slices based on 3-D input data. Rendering process 424 generates 2-D slices in a format that can be uploaded to the volumetric display.

Setup process 406 includes loading 400 calibration geometry data from a file (e.g., a stored external to the display system 50) to the GPU. The calibration geometry data can be specific to the display and can be used to correct for manufacturing variations in the display (e.g., the calibration geometry can correct for distortion based on variation in the optical components). The calibration geometry data can also be used to reduce the effects of distortion that are introduced by the display (e.g., distortion due to the angle or rotation of screen 5 onto which the image is displayed). Setup process 406 also includes selecting a slice buffer resolution 402. The slice buffer is a buffer that includes data of a higher resolution or fill color range. The slice buffer resolution can be selected to achieve a desired detail and color resolution in the projected image. For example, if a digital micromirror device (DMD) is used to generate the image, the detail and color resolution can be selected to be the resolution of the DMD. A DMD (Texas Instruments, Plano, Tex.) is a high-bandwidth spatial light modulator. In addition, setup process 406 includes initializing various factors used in algorithms for transforming the 3-D data into a format used by the display.

Pre-render process 414 includes loading image data 408 onto the GPU from a data source (e.g., a data source external to display system 50). During the pre-render process 414 the GPU also processes user specified image transforms 414. For example, a user may manipulate or transform an image by re-centering, re-orienting, or re-scaling the image with respect to the location, orientation, or size of the initial image. Pre-render process 414 can also include processing other user inputs that will affect the displayed image.

Rendering process 424 is used to generate 2-D data slices in a format that can be uploaded from the GPU to the display. The 2-D data slices can be generated by the GPU based on the initial data loaded into the image processing system 50. Rendering process 424 includes performing texture mapping 416. Texture mapping is a process that maps a 2-D surface (e.g., a polygon) with coordinates in the 3-D image data. This mapping mimics the mapping from the projected slice on the display into real space.

Rendering process 424 also includes performing color mapping 418. Color mapping is a process used to represent the color of a pixel in a format used by the display. For example, in some embodiments, high color resolution data (e.g., 256 colors) is converted into a single bit (e.g., on/off) representation for each color such that the data can be displayed using the DMD.

Rendering process 424 also includes performing data formatting 420. Data formatting includes converting the data from an original format to a format understandable by the display. For example, data formatting can include converting higher precision image data to lower precision image data. Details of the above processes are described in more detail below.

Before executing the volumetric rendering algorithm, display system 50 initializes several elements.

In display system 50, slice calibration geometry data is loaded into the GPU. The slice calibration geometry data describes the surfaces onto which the 3-D image is displayed. For example, the geometry data for a cylindrical coordinate system can include the degree of rotation of the screen 5. In some embodiments, the display has 396 surfaces (e.g., planes) of predictable orientations (e.g., having predefined theta) forming a double cover of a cylindrical coordinate system; for each slice s in [0, 198), slice s and s+198 occupy the same region. The optics of the display system can introduce variation in the projected image. In addition to the different orientation and coordinates for each of the slices, the system may introduce distortion. Both the differences in orientation and the distortion can be accounted for in the initialization. In order to correct for manufacturing variations of the display, each slice has a unique calibration transformation matrix. A calibration transform matrix is a matrix that is used for manipulating the image data based on the desired calibrations. The calibration transformation matrices are determined a priori during a separate calibration process. Different displays can possess unique sets of calibration transformation matrices.

For example, in some embodiments, a simple form of display calibration is a per-slice 2-D homogeneous transformation (a 3×3 matrix, with 8 degrees of freedom). This matrix is computed by inferring the transformation from four known points to four unknown points. The points are non-collinear. If the four points are arranged in a slice of a known configuration (e.g. a square), then a 3×3 matrix can be recovered using linear algebra. This operation need not be performed for every slice. For example, it can be sufficient to perform the operation for a few slices (6, for example) and interpolate the transform between slices.

During the initialization process, the slice geometry should be loaded onto the GPU. For each slice, each location and associated calibration transformation matrix should be loaded. The GPU uses two off-screen rendering buffers: a slice buffer and an output buffer. As described above, the slice buffer is a buffer that includes data of a higher resolution or full color range. In contrast, the output buffer includes data formatted for the display. For example, if a DMD display is used, the higher resolution data can be used to generate data having a single on/off representation for each color of the pixel. If off-screen rendering buffers are implemented as rendering contexts then these rendering contexts should be able to share textures.

In some embodiments, a geometric model is described as a collection of triangles, which are described in terms of vertices, which has some 3-D position (x, y, z). Additionally, for texture mapping, each vertex has a 2-D texture coordinate (s,t). The correspondence between positions and texture coordinates define a warping function that maps points on a model to points within a texture image. When the model is drawn, the color of each point of the model is determined by the corresponding point in the texture image. The range of legal texture coordinates are in the unit interval [0, 1].

Subsequent to loading the slice geometry, the slice buffer resolution is selected to achieve the desired level of detail in the projected image on the display. For example, in some embodiments, each slice natively has a resolution of 768 by 768 pixels with 3-bit color depth (one bit each for red, green and blue color channels). Because the GPU renders at a significantly higher color depth (typically between 5 and 8 bits per color channel), the GPU converts higher precision image data (e.g., data in the GPU format) to lower precision image data (e.g., data in the DMD format) to reduce the effective resolution of each slice. This process is called halftoning. For example, in some embodiments, slice buffer resolutions of 256 by 256 to 768 by 768 can be used. At lower resolutions, the image quality may suffer, but can still be useful. The slice buffers need not be of the same square aspect ratio as the native slice resolution (e.g., a slice buffer resolution of 512 by 256 is acceptable).

The contents of a slice buffer should be bound (e.g., used as the current context) as a texture called the slice texture. The slice texture should enable texture filtering, and can set both horizontal and vertical texture wrap modes. In some embodiments, the render-to-texture Open Graphics Library (OpenGL) application program interface (API) extension allows off-screen rendering buffers to be later bound as textures. If this extension is available, the slice buffer and slice texture occupy the same region of video memory. Otherwise, it becomes necessary to copy the slice buffer to a separate slice texture. Because GPUs often prefer power-of-two texture dimensions, it can be advantageous to select a slice buffer resolution with power-of-two dimensions (e.g. 256×256 or 128×32).

In some embodiments, the output buffer is selected to have a lower resolution than the original resolution of the image data. For example, the output buffer resolution can be selected to be a fraction (e.g., $1/8^{th}$) of the native slice resolution horizontally and the same as or a fraction of the native slice resolution vertically. In some embodiments, the output buffer resolution is 96 by 768 pixels.

During the initialization, the dither matrix is loaded as a 2-D texture called the dither texture. The dither matrix includes a set of threshold values used to convert the higher precision image data to lower precision image data. The dither texture should disable texture filtering and set both horizontal and vertical texture coordinate wrap modes to repeat. This allows a dither matrix to be used to cover the entire slice buffer without having the same resolution. In some embodiments, the dither matrix includes a noisy threshold function and results in a tradeoff between the resolution of the displayed image and the color of the image.

The initialization process also includes initializing a color map. In general, the color map corresponds to a lookup table used to determine a color associated with a particular pixel based on the image data. In some embodiments, volumetric image data is not directly rendered. Instead, it first undergoes a color map lookup. The color map lookup is implemented as a 1-D texture called the color map texture (as described below). The color map texture can enable texture filtering and can set the texture coordinate wrap mode to various settings. Texture wrap modes determine how coordinates outside this range are mapped back into the legal range. Examples of texture wrap modes include a clamp mode and a repeat mode. In clamp mode, coordinates greater than 1 are mapped to 1 and coordinates less than 0 are mapped to 0. In repeat mode, only the fractional part of the coordinates is used. For example, in some embodiments, the display supports 8-bit image data. Therefore, in order to have a unique entry for each possible value in the image the color map texture should have 256 entries.

During the initialization, shader programs are also loaded into the GPU. A shader program is a program that executes on the general processor (e.g., the video card) and performs color mapping and dithering as described below. Each off-screen rendering buffer has a shader program associated with it. The slice buffer has a fragment program called the color map shader and the output buffer has a fragment program called the output shader. The color map shader performs a color map operation and the output shader formats the slice for spatial light modulator output (e.g., DMD output).

In some embodiments, the display includes a double-buffered frame buffer acting as a backing store and the rendering algorithm is only executed when necessary. A number of events can trigger algorithm execution. For example, the algorithm can be executed in response to feature changes. For example, the algorithm can be executed when the user loads new image data, when the image data is manipulated, or when the color map changes.

Figure 5:
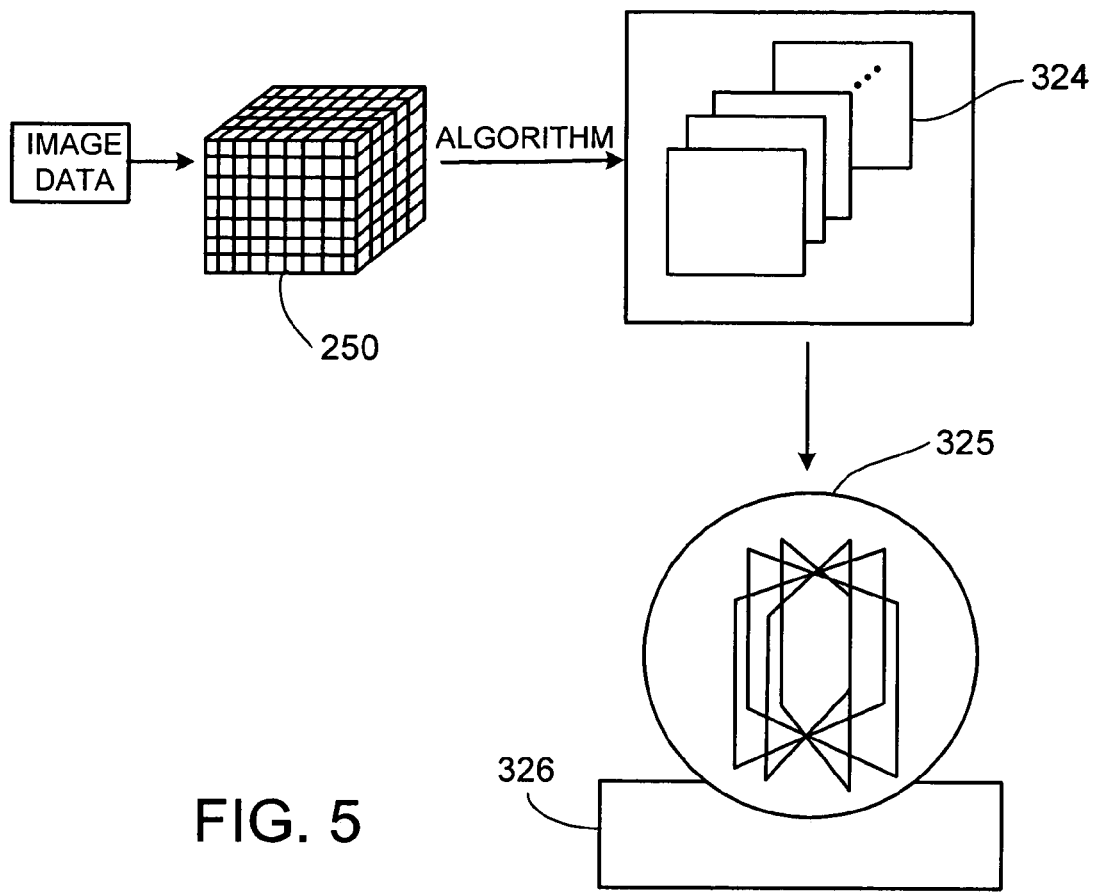
FIG. 5 is a block diagram of a rendering process.

Referring to FIG. 5, in some embodiments, the user loads image data 250 by selecting an image set (e.g., Digital Imaging and Communications in Medicine (DICOM) standard images). Images in the selected image set do not necessarily have power of two dimensions, nor are the individual image elements (e.g., 3-D pixels) necessarily cubic. As shown in FIG. 5, the image data 500 is implemented as a 3-D texture called image texture 250. The dimensions of the texture are not known until the user selects the image. When image data 500 is loaded into image texture 250, a normalization transformation called the image data transform is computed. For each texture image dimension, the GPU maps the texture coordinates [0, 1] to the extents of the image data.

As described below, the user can manipulate the image data 250 by re-centering it, re-orienting it, or re-scaling it. The user can focus on specific regions to present details in a clearer manner. For example, if the user wants to view a particular section of the entire image in greater detail, the user can virtually reposition the display around the section and zoom in so that the interesting section fills the display.

The user can manipulate the color map texture to filter relevant portions of the image. In some embodiments, for example, the user selects a range of relevant image values, and portions of the image outside that range are not drawn. Within the range, image values are mapped linearly such that the smallest value in the range is black and the largest value in the range is white. Because the underlying method uses dependent texture mapping, the rendering algorithm is more flexible and allows an arbitrary mapping of image values to colors.

As shown in FIG. 5, a 3-D volume or image is formed on the volumetric display by compositing multiple 2-D slices 325. In some embodiments, the display uses a fixed projector and a rotating screen to sweep out a volume. The contents of these 2-D slices can be difficult to compute. In order to compute the 2-D slices, an algorithm uses the GPU to slice image volume 250 into 2-D slices 325 and format the slices to be uploaded to the display 326.

The basic rendering algorithm is performed using both a GPU and a CPU. Through pipelining, both the CPU and the GPU can work concurrently. In some embodiments, the GPU performs most of the computational work while the CPU directs the GPU and moves data from the GPU to display 326.

The GPU performs the initial steps of volume rendering on slice buffer 324. Slice buffer 324 should be made current. Thus, the GPU binds slice buffer 324 as the current rendering buffer. After slice buffer 324 is made current, the inputs for slice buffer 324 should be bound. In some embodiments, the GPU binds the color map texture, image data texture, and color map shader program before rendering occurs in the slice buffer.

The GPU also performs cylindrical slice mapping or texture mapping. Texture mapping is the process when a GPU maps a polygon specified in the texture image with texture coordinates to a polygon specified in the image space with vertex coordinates. The mapping between the image data texture and the contents of the slice buffer should mimic the mapping from the projected slice in the display into real space. The texture coordinates index the corresponding slice of the image data texture.

The GPU also performs geometric operation sand calibration transforms on the image data 250. For example, in some embodiments, the projector is fixed at the end of a folded optical path. From the frame of reference of rotating screen assembly, projected image appears to be oblique and rotating. To achieve a properly oriented projected image, image transformations (respectively, a perspective projection and a rotation) should be inverted. Determining these inverse transformations is called calibration, and the calibration transformations are stored on the display. Because the transformations are non-singular linear transformations, the inverse transformation is also a non-singular linear transformation.

Figure 6:
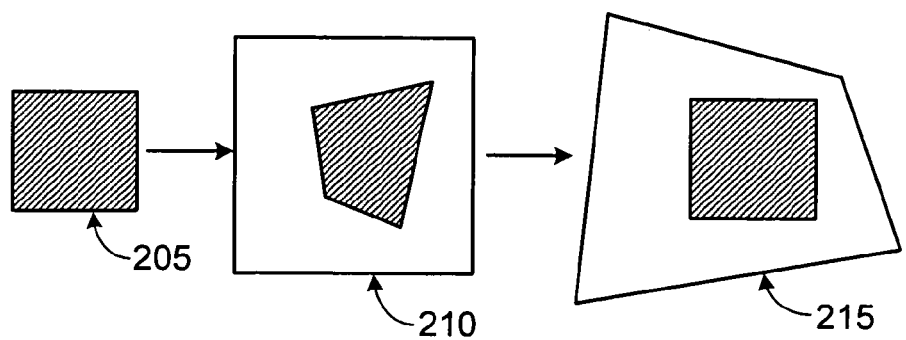
FIG. 6 is a block diagram of a calibration transform.

An example of the calibration transformation is shown, for example, in FIG. 6. In some embodiments, a rotating screen is the projection surface for a sequence of radially disposed slices. Each slice is a 2-D image which best contributes to a region of the desired 3-D image. The desired appearance of a slice to the observer is a desired image 205.

The desired image 205 appears distorted on the screen when naively projected as an un-calibrated projection 210. For example, due to the orientation of screen 5, the image may appear elongated or skewed if it is projected without being calibrated. In addition, various defects or characteristics of the optical path and other components may produce additional distortion in un-calibrated projection 210. Such distortion can be corrected or accounted for using the calibration of the image data. For example, the GPU can perform an inverse calibration transform of the image data such that the calibrated image 215 appears correct. The calibration transform can make the calibrated image appear as if the un-calibrated image 210 were projected upon an oblique screen.

In some embodiments, the GPU performs geometric operations (such as rotations, translations, and scaling) to the image before displaying. For example, in some embodiments the user can zoom in on a particular region of a medical image. These geometric operations can be expressed as linear transformations.

Figure 7A:
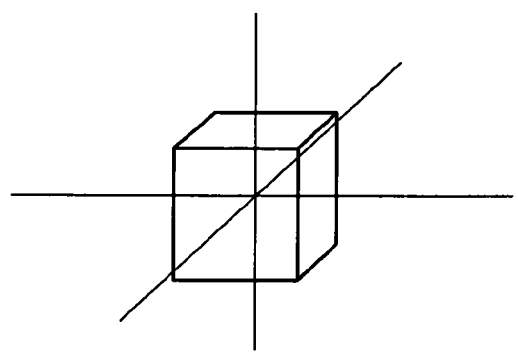
FIGS. 7A-7F are diagrams of image manipulations.
Figure 7B:
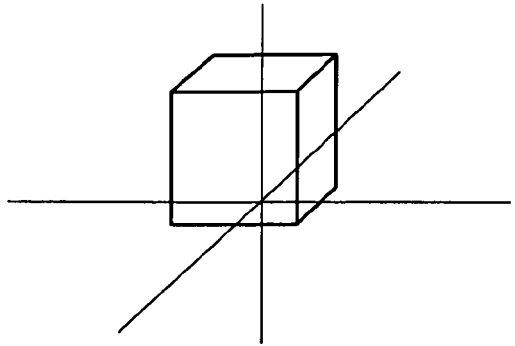

As shown in FIGS. 7A and 7B, a user may re-center the image. In general, re-centering the image moves the offsets the image by a user specified amount. Re-centering can allow a user to view a portion of the image not previously rendered on the display.

Figure 7C:
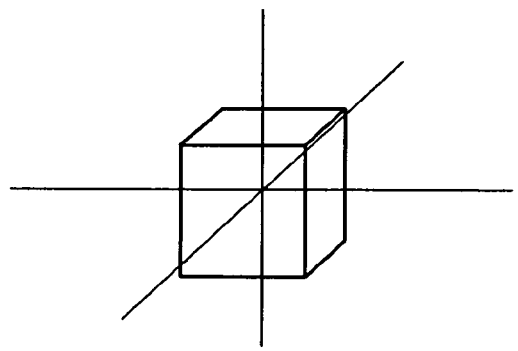
Figure 7D:
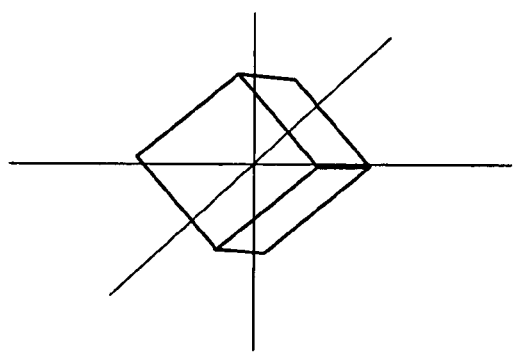

As shown in FIGS. 7C and 7D, a user may also re-orient the image. Re-orienting the image effectively rotates the image in three-dimensional space such that the user can view the object from a different orientation. Re-orienting the image allows the user to view the image from different perspectives and allows the user to view different sides or portions of the image.

Figure 7E:
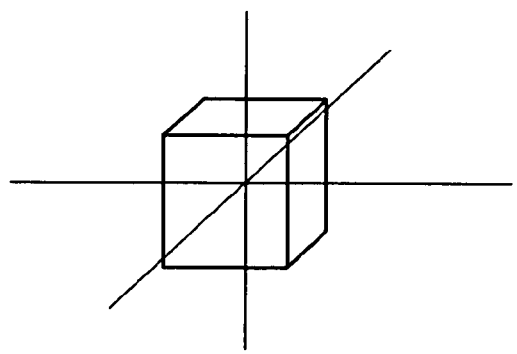
Figure 7F:
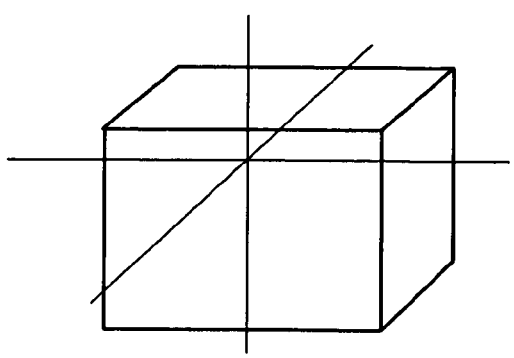

As shown in FIGS. 7E and 7F, a user may also re-scale the image. Re-scaling allows the user to select a portion of the image and effectively zoom in or out to see the image in greater detail or to see a larger region of the image.

Because both the calibration and geometric operations are linear transformations, they are composable as a linear transformation. In some embodiments, the GPU performs both transformations in a 4×4 matrix and uses the GPU texture matrix to perform the composed transformation. The calibration and geometric operations can include transformation to correct for distortion in the system or to modify the image based on user input such as re-centering, re-orienting, or re-scaling of the image.

The GPU also renders the slice to texture. For example, the GPU can draw a full-screen quad in the slice buffer. In some embodiments, the fragment program only runs for each pixel rendered. Rendering a full-screen quad is a convenient way of rendering to all pixels in a buffer, thereby executing the fragment program for every pixel. The color map shader program runs for each pixel in the slice buffer. The GPU binds the output as the current rendering buffer and the next steps of volume rendering are performed on the output buffer. After the output buffer is made current, the inputs for the output buffer should be bound. The slice texture, dither texture and output shader are all bound before rendering occurs in the slice buffer.

The GPU also renders the DMD formatted slice. For example, the GPU can draw a full-screen quad in the output buffer. The output shader runs for each pixel in the output buffer. The quad's texture coordinates are set up such that each output shader pixel fetches 8 adjacent pixels from the slice texture. The output shader halftones the image texture using the dither matrix and packs them into a single pixel in the output shader. The rendering of the DMD formatted slice uses data from a slice texture to generate an output that the DMD display can understand. For example, the rendering can include converting the data into a single bit per color representation as used by the DMD.

After the image data is formatted into a format compatible with the spatial light modulator (e.g., a DMD), the data is copied from the GPU-accessible video memory to CPU-accessible memory.

The GPU copies the front buffer to the back buffer. More specifically, in the some embodiments the DMD frame buffer is large. In such embodiments, because the DMD frame buffer bandwidth is large, the display only allows drawing commands to the back buffer. However, it provides an efficient way to copy the contents of the front buffer to the back buffer. This way, it is possible to progressively update the display volume by sending image data incrementally. Before the new slice is uploaded copy the contents of the front buffer to the back buffer.

At this point, the back buffer contains the same content as the front buffer. The contents of the output buffer are copied from CPU-accessible memory to the appropriate slice in the back buffer. This uploads a new slice to display.

Much like other double-buffered rendering hardware, in some embodiments, the GPU provides an efficient buffer swap operation to avoid "tearing" in the displayed volume. Double buffering uses two separate buffers to hide or reduce the effects of the incremental process of rendering. Rendering is performed (invisibly) on the render buffer while a separate, visible buffer is presented on the display. When rendering is completed, the two buffers are swapped. Swapping the front and back buffer displays the newly uploaded slice among the previously drawn slices. Visually, observers only see completely rendered scenes.

In addition to the features described above, embodiments can also include one or more of the processes described below.

Color Mapping is a method with particular utility in medical imaging. Original VGA video cards had a similar kind of indirection; a frame buffer stored a set of 8-bit image values and the RAMDAC contained a 256-entry color table. During a screen refresh, for each pixel in the frame buffer the RAMDAC would look up the 8-bit image value in the 256-entry color table and output that indexed color to the monitor.

Figure 8:
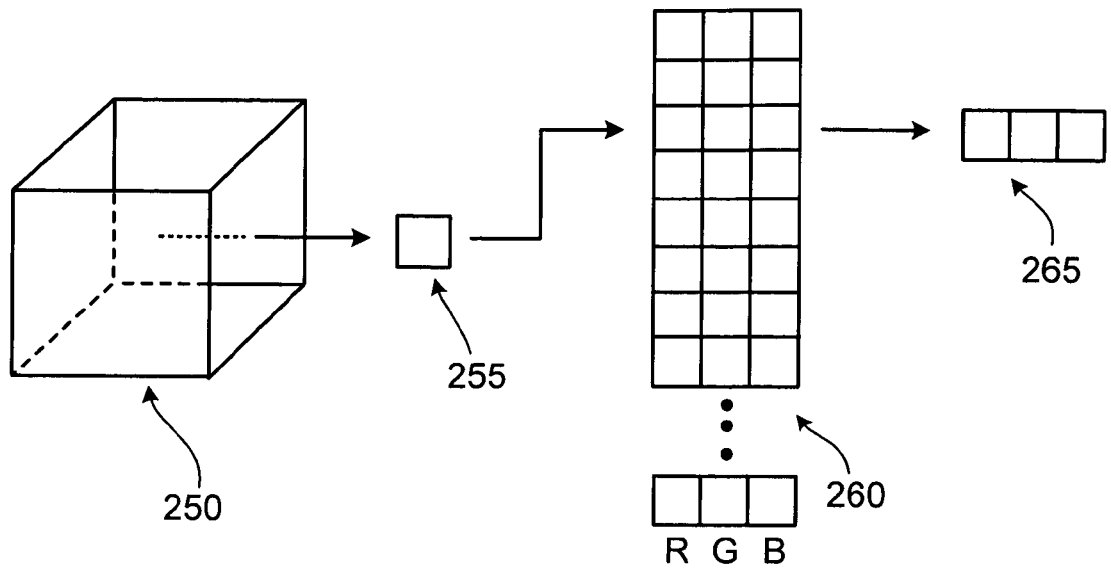
FIG. 8 is a block diagram of a color mapping process.

In some embodiments, the rendering algorithm does not perform this look up during refresh; instead, it performs it when it renders slices. As shown in FIG. 8, an image 250 contains 8-bit image values 255 and a color map 260. For example, color map 260 can be a 256-entry 1-D texture map. During slice rendering, for each fragment generated by rasterization, the color map shader PROGRAM looks up an image value 255 in the color table 260 and stores it in a slice buffer 265.

The display system can also perform DMD formatting. In order to exploit the high bandwidth of the DMD as useful display resolution (e.g., within an autostereoscopic display), it can useful to employ an efficient computational device such as GPU. GPUs are efficient in performing graphical computation and their commoditization and broad adoption throughout consumer electronics has made them relatively cheap and powerful. However, DMDs and GPUs operate on different data sizes. This is often referred to as a computational "impedance mismatch." A DMD is natively a 1-bit per pixel spatial light modulator with separate planes for each of 3 color channels (red, green, and blue). A GPU typically stores each of 4 color (red, green, and blue+alpha) channels in 8-bit precision. Thus, a format conversion is needed for the two to communicate.

As described above, the process of converting higher precision image data (e.g., data in the GPU format) to lower precision image data (e.g., data in the DMD format) is called halftoning. Halftoning reduces the number of bits used to represent a pixel. In order for the GPU to efficiently perform halftoning in a fragment shader program, a pixel-parallel algorithm should be used. For example, the GPU can use dispersed-dot ordered dithering, a process well understood by those familiar in the art.

A dither matrix should be loaded as a 2-D texture called a dither texture. As described above, the dither matrix includes a set of threshold values used to convert the higher precision image data to lower precision image data. In general, a value for a particular pixel can be compared to an associated entry in the dither matrix to produce an on/off representation based on whether the value for the pixel is greater than, equal, or lower than the associated threshold value.

The dither texture should disable texture filtering and set both horizontal and vertical texture coordinate wrap modes to repeat. This is so that a dither matrix can be repeated to cover the entire source image without matching the same resolution.

Figure 9A:
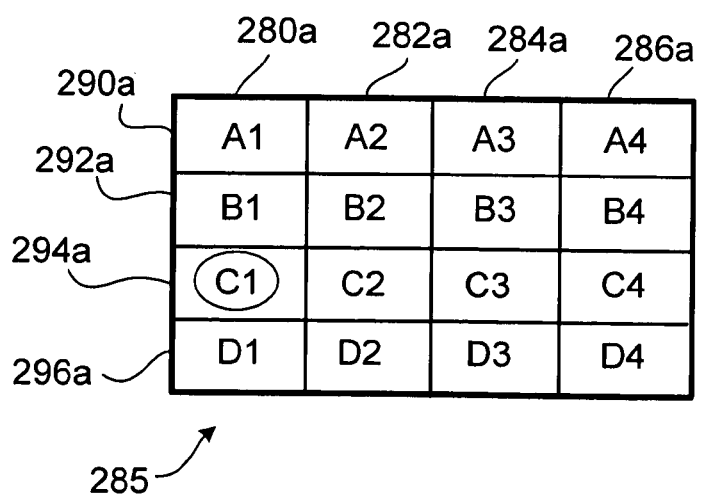
FIGS. 9A-9C show dither matrixes.
Figure 9B:
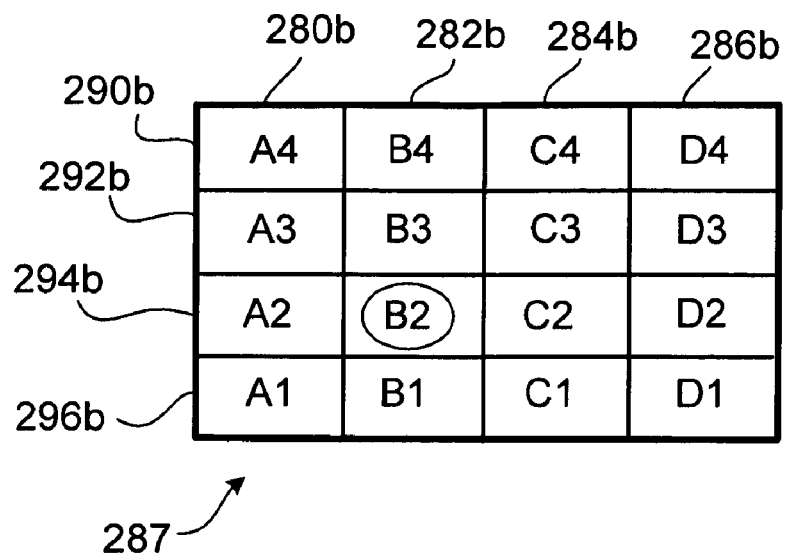
Figure 9C:
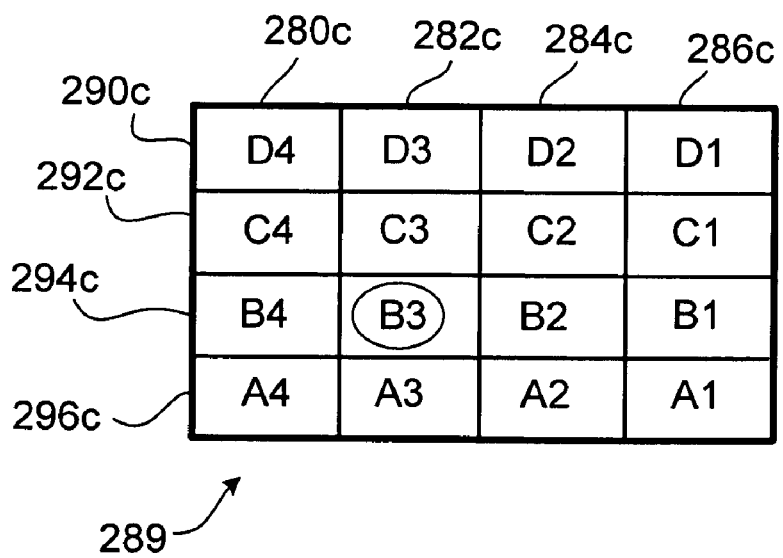

As shown in FIGS. 9A, 9B, and 9C, rotating the dither kernel in 90-degree increments (an operation efficiently accomplished by permuting and negating the dither texture coordinates) results in de-correlated dither kernels.

For example, the dither kernel 285 shown in FIG. 9A includes 12 values arranged in a 4×4 matrix. A different dither kernel 287 (FIG. 9B) can be generated based on dither kernel 285. In this example, dither kernel 285 is effectively rotated by 90 degrees in a counter clockwise direction. In order to generate dither kernel 287, the first row 290a (including values A1, A2, A3, and A4) of kernel 285 becomes the first column 280b in kernel 287, the second row 292a (including values B1, B2, B3, and B4) of kernel 285 becomes the second column 282b in kernel 287, the third row 294a (including values C1, C2, C3, and C4) of kernel 285 becomes the third column 284b in kernel 287, and the fourth row 296a (including values D1, D2, D3, and D4) of kernel 285 becomes the fourth column 286b in kernel 287. This process can be repeated to form additional dither matrices. For example, dither matrix 289 shown in FIG. 9C is generated by effectively rotating dither matrix 287 by 90 degrees in a counter clockwise direction. Thus, the first row 290b (including values A4, B4, C4, and D4) of kernel 287 becomes the first column 280c in kernel 288, the second row 292b (including values A3, B3, C3, and D3) of kernel 287 becomes the second column 282c in kernel 289, the third row 294b (including values A2, B2, C2, and D2) of kernel 287 becomes the third column 284c in kernel 289, and the fourth row 296b (including values A1, B1, C1, and D1) of kernel 287 becomes the fourth column 286c in kernel 289. While in the above examples the kernel is effectively rotated by 90 degrees in a counter clockwise direction, the matrix could also be rotated in a clockwise manner.

Rotating the dither kernel for adjacent slices can provide various advantages. For example, by effectively rotating the dither texture by 90-degree increments for each consecutive slice of data, the pixels in adjacent slices will be compared to different threshold values. Thus, the rotation of the dither kernel assures that the threshold values for adjacent slices of data are not correlated.

For example, by rotating the dither matrix 285 shown in FIG. 9A to generate dither matrix 287 shown in FIG. 9B and rotating dither matrix 287 shown in FIG. 9B to generate dither matrix 289 shown in FIG. 9C, the dither values for a particular location in the dither matrix are uncorrelated between the adjacent matrices. For example, the value of the dither matrix at the intersection of column 282 and row 292 is 'C2' in matrix 285, 'B2' in matrix 287, and 'B3' in matrix 289.

In some embodiments, it can be beneficial to have non-correlated threshold values to reduce artifacts in the image and to distinguish among different shades of a particular color. This can be useful, for example, between adjacent slices or adjacent views in the display to hide the periodicity of the dither texture.

While the exemplary dither matrix described above is a 3×3 matrix, any size matrix can be used. For example in some embodiments, the size of the dither matrix is 16×16.

During slice generation, each color component in each pixel of the source image value 255 is compared with the corresponding color component in the pixel in the dither texture. If the value of the image component is greater than the dither component then the output for that component is 0.5, otherwise it is 0.

Figure 10:
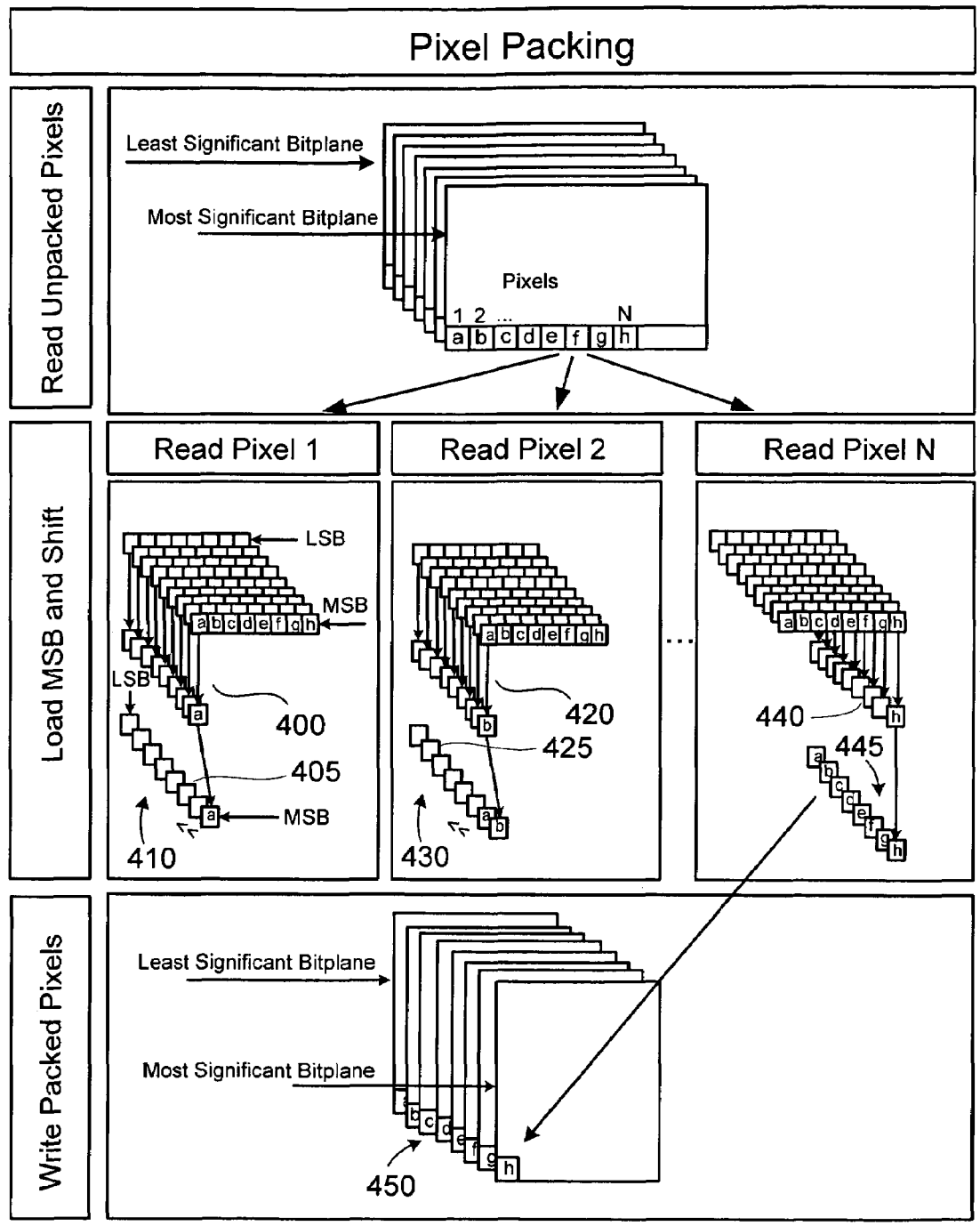
FIG. 10 is a block diagram of a pixel packing process.

FIG. 10 illustrates a pixel packing process. During the pixel packing process, the image data is reduced to 1-bit per pixel; in 2's complement fixed point notation normalized from the range [0,1], 0.5 maps to a binary number where only the most significant bit is 1, and the rest are 0. Because this data should be transferred off the GPU and the GPU's internal computation and data bandwidth is far greater than the bandwidth between the GPU and CPU (e.g., by 1 or 2 orders of magnitude), it is better to first pack this sparse data.

The most significant bit (MSB) for each of the N adjacent components are packed into a single N-bit component in a manner similar to a shift register implemented as a GPU fragment shader. A register, referred to as the "shift" register, is dedicated to perform the component-wise shift of the MSBs. Initially, the shift register is cleared to zeroes. In some embodiments, this does not need to be performed explicitly because all registers are initialized to zeroes in a fragment program. In some embodiments, N equals 8.

A halftoned pixel is read from a texture (400, 420, 440). It is added to the shift register (405, 425, 445). Because the pixel can only have a non-zero bit in the MSB of each component, it can only affect the MSBs of the shift register, essentially copying the MSBs. Then, the shift register is "right shifted" by multiplying the shift register by 0.5 (410, 430). This process is repeated until N adjacent halftoned pixels are read and packed into the shift register. Then, the shift register is stored as the output 450.

While certain embodiments have been described above, some embodiments can include additional features.

In some embodiments, the GPU can perform anisotropic filtering. Normally, GPUs are capable of band-limiting the texture to avoid aliasing. However, when rendering slices, the direction perpendicular to the slice is not considered by the GPU. Therefore, it can be important to band-limit the signal in the texture axis perpendicular to the slice. This can be accomplished in the color map shader. In some embodiments, the perpendicular axis can be encoded as a function of position in the slice buffer. For example, a texture map can be used. In some embodiments, the thickness of a slice varies slowly and linearly. Thus, it can be approximated by a low resolution texture, which acts as a position-indexed lookup table.

In some embodiments, the slices can be rendered as a batch. As described above, individual slices can be rendered individually. However, it can be inefficient to render individual slices because switching between different rendering contexts (for example, the slice buffer and the output buffer) can be a time consuming operation that requires performance-stealing synchronization on the GPU. To reduce the number of context switches, the rendering algorithm can perform each stage of the operation to multiple slices before moving on to the next stage. This approach can also parallelize the operation across multiple GPUs.

In some embodiments, the slices can be loaded in a non-sequential order such that the image is generated using a progressive update scheme. Due to the length of time needed to upload data to the display, it can be desirable to provide feedback to the user as quickly as possible, as well as allow the user to interrupt the algorithm to manipulate the image at a rate faster than a full volume update. In order to give the user timely feedback of the entire volume, the displayed slices can be distributed around the volume rather than drawn sequentially. When rendering batches of slices, the slices within a batch can be dispersed uniformly rather than clustered, and the batches themselves should be interleaved in a similar manner.

Figure 11:
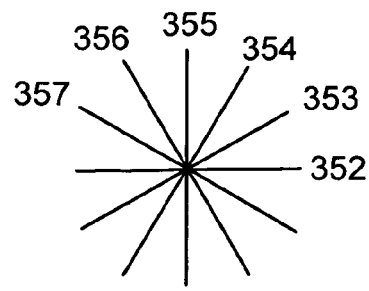
FIG. 11 is a diagram of rendered slices.

For example, as shown in FIG. 11, an exemplary fully rendered image is shown to include six slices (i.e., slices 352, 353, 354, 355, 356, and 357). More typically, a displayed image will include a substantially greater number of slices. For example, in some embodiments the display includes 396 slices each having a different theta. As described above slices 352, 353, 354, 355, 356, and 357 can be rendered in a sequential order (e.g., as shown in FIGS. 12A-12F) or in a non-sequential order (e.g., as shown in FIGS. 13A-13F).

Figure 12A:
FIGS. 12A-12F show a sequential rendering of multiple slices.
Figure 12B:
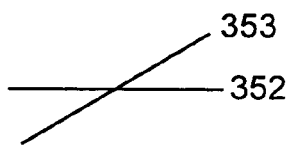
Figure 12C:
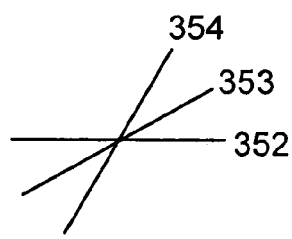
Figure 12D:
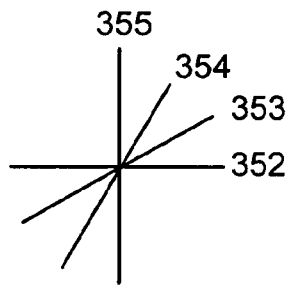
Figure 12E:
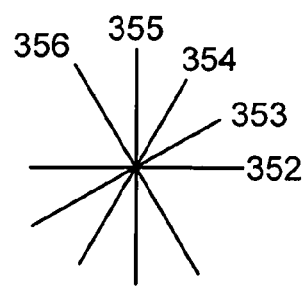
Figure 12F:
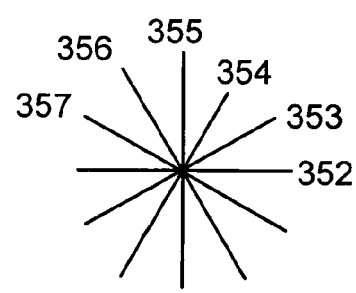

FIGS. 12A-12F show the rendering of slices 352, 353, 354, 355, 356, and 357 in a sequential order (e.g., a sequential order with respect to theta). Such a rendering begins at a particular theta and sequentially renders each adjacent slice until the all slices have been rendered. In this example, the rendering begins with slice 352 and proceeds in a counter clockwise manner with respect to theta. Thus, the order in which the slices are rendered is slice 352 (FIG. 12A), slice 353 (FIG. 12B), slice 354 (FIG. 12C), slice 355 (FIG. 12-D), slice 356 (FIG. 12E), and finally slice 357 (FIG. 12F). Thus, the full resolution image is generated for the theta ranges closest to the initial slice before any portion of the image is generated in other theta ranges.

Figure 13A:
FIGS. 13A-13F show a non-sequential rendering of multiple slices Like reference symbols in the various drawings indicate like elements.
Figure 13B:
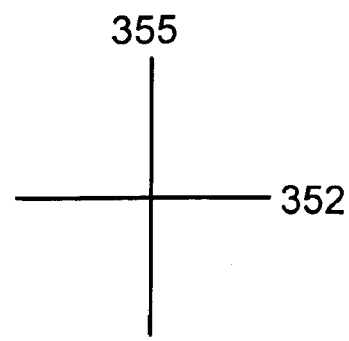
Figure 13C:
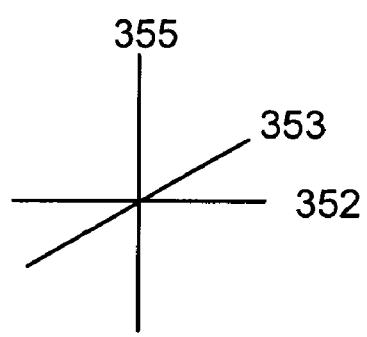
Figure 13D:
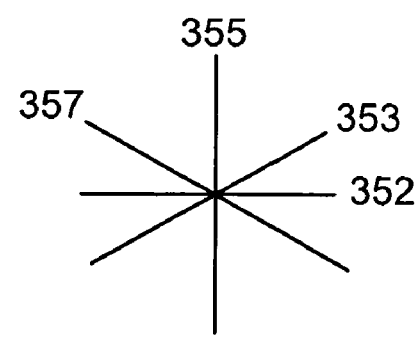
Figure 13E:
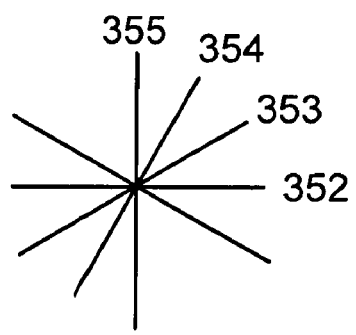
Figure 13F:
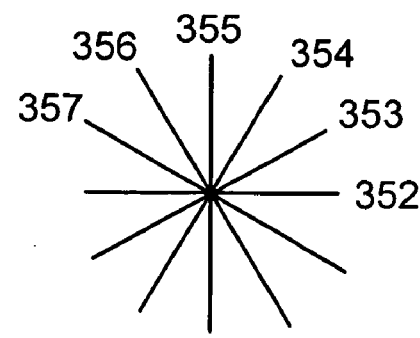

FIGS. 13A-13F show the rendering of slices 352, 353, 354, 355, 356, and 357 in a non-sequential order (e.g., a non-sequential order with respect to theta). In this embodiment, the slices are rendered such that adjacent slices are not rendered sequentially. Instead, the displayed slices are distributed around the volume. For example, the order in which the slices are rendered is slice 352 (FIG. 13A), slice 355 (FIG. 13B), slice 353 (FIG. 13C), slice 357 (FIG. 13D), slice 354 (FIG. 13E), and finally slice 356 (FIG. 13F). Thus, a low-resolution image is initially formed and the resolution is increased as the number of rendered slices increases. In effect, the progressive update allows a user to begin viewing the whole image before it is completely downloaded, and the image refines over time as additional slices are rendered.

For example, in comparing the image after the rendering of 3 slices (e.g., as shown in FIGS. 12C and 13C) the sequential rendering generates a high or full resolution portion of the image over a narrow range of the theta values while the non-sequential rendering (FIG. 13C) generates a low resolution image over the entire range of theta values. More specifically, as shown in FIG. 12D, the full resolution of the image has been rendered in the top right and bottom left quadrants, but no slices have been rendered in the top left and bottom right quadrants. In contrast, as shown in FIG. 13D the rendered slices are distributed about the entire volume.

In some embodiments, the system can support multi-channel or vector image data types (e.g., fused PET/CT). For example, color-mapping can be viewed as a mini-algorithm within the greater algorithm because GPUs are programmable. The mini-algorithm can be viewed as an "input" to the greater algorithm and not really part of the algorithm itself. The image data can be considered an input to the mini-algorithm than an input to the greater. This distinction is important because specifying the greater algorithm should not depend on the choice of mini-algorithm.

The general role of the color map shader can be called "color generation." Different color generation shaders can have differing numbers and kinds of inputs. For example, a very simple color generation shader might take no inputs and only generate a static image. A more sophisticated color generation shader might take multiple image inputs and other parameters. A medical imaging application, as an example, may fuse data from both structural scans (e.g., CT) and functional scans (e.g., PET or MRI). In another example, seismic imaging frequently combines several forms of data, such as porosity, permeability or lithofacy. Additional inputs can be synthesized and pre-computed based on the input image data. For example, the gradient magnitude and curvature can be a useful measure that helps better isolate particular image features.

Conceptually, color generation may consist of two tasks: classification and shading. The color mapping shader is a simple color generation shader that performs classification and coloring in a single step.

For example, regions of high gradient magnitude in CT images typically indicate a boundary between two structural features and regions of high value in PET images typically indicate highly active functional features. A "higher order" classification can combine information in these two separate classifications to achieve a better presentation than either separately. For example, one may be able to highlight a tumor boundary by finding boundaries of structural features (e.g., from CT gradient magnitude) that are also active functionally (e.g., from PET value).

In shading, classification yields information about what an image represents on an element-by-element (e.g., pixel-by-pixel) level. To visualize these classifications, some method is chosen to convert a classification to a color. Typical choices include (but are not limited to) lighting or texture mapping.

In some embodiments, a programmable shading can be used. As described above color mapping is one method to display data. However, color mapping does not necessarily extend well to multi-channel or vector image data. GPUs are programmable; because the display-specific parts of the algorithm (calibration, slicing, halftoning, packing) are performed separately from the display-independent parts (transformation, color mapping), it is possible to expose the full programmability of the GPU during rendering. This can allow the user to create methods of viewing the data that are specific to the application and create value for the algorithm outside the field of medical volume visualization.

In some embodiments, the user may want to overlay geometric rendering with volumetric images. For example, a user might desire to display both the volumetric image and a set of three-dimensional coordinates. In an additional example, the user may desire to display a computer-generated icon such as a pointer in addition to the image. The computer-generated icon can be based on input received from a user such that the user can control the icon to point to different portions of the image.

In general, while the projection screens in the embodiments described above are disk-shaped, projection screens of other shapes can be used, such as, for example, rectangular plane or helical screens. Moreover, although the screen assembly in system 50 is flat, in certain embodiments, the screen assembly may be of other shapes, such as a cylinder, a complete (non-truncated) sphere, or any solid, although there are advantages to the solid's having symmetry about the rotational axis (for balance and for minimized air resistance) and being as optically neutral as possible (facets may cause unwanted reflections, diffraction, and so forth). Furthermore, additional optical elements may be included in display systems to perform image enhancement (e.g., of brightness, viewing angle sensitivity, etc.) or may vary the color or brightness of the image or sections of the image; for instance, to equalize the apparent 3-D image brightness regardless of position from the axis of rotation.

Moreover, while the foregoing description is made in the context of certain embodiments of 3-D displays, the methods and systems can be implemented in other display architectures. For example, other exemplary display architectures are described in G. E. Favalora et al, "Volumetric three-dimensional display system with rasterization hardware," in Stereoscopic Displays and Virtual Reality Systems VIII, Andrew J. Woods, Mark T. Bolas, John O. Merritt, Stephen A. Benton, Editors, Proceedings of SPIE Vol. 4297, pp. 227-235 (2001), G. E. Favalora et al, "100 Million-voxel volumetric display," in Cockpit Displays IX: Displays for Defense Applications, Darrel G. Hopper, Editor, Proceedings of SPIE Vol. 4712, pp. 300-312 (2002), U.S. Pat. Nos. 2,967,905, 3,140,415, 6,100,862, and 6,554,430.

Accordingly, other embodiments are within the scope of the following claims.

What is claimed is:

1. A method, comprising:
sequentially generating a plurality of sets of data, each set corresponding to an intersection of a three dimensional (3D) image projected by a three dimensional display with a surface, each set of data corresponding to a two dimensional (2D) image representing a slice of the 3D image associated with the intersection of the 3D image with the surface,
sequentially projecting 2D images onto a rotating screen to render a three dimensional image,
wherein each projected 2D image is produced based on a corresponding set of data, and wherein the sequence in which the 2D images are projected is different from the sequence in which the sets of data are generated such that 2D images corresponding to non-adjacent slices of the 3D image are projected first to generate a coarse representation of the whole 3D image, then the 3D image is refined over time as additional 2D images are projected.

2. The method of claim 1, further comprising:
providing initial data corresponding to the three dimensional image;
generating the plurality of sets of data from the initial data; and
operating, using a data processor, on the sets of data to re-center the three dimensional image.

3. The method of claim 1, further comprising calibrating the sets of data based on calibration information associated with the three dimensional display, wherein the calibration reduces a distortion of the three dimensional image introduced by the three dimensional display.

4. The method of claim 3, wherein calibrating the sets of data comprises performing a linear transform on the initial data to reduce the effect of distortion.

5. The method of claim 1, wherein the operation to re-center the three-dimensional image comprises performing a linear transform on the initial data based on information provided by a user of the three-dimensional display.

6. The method of claim 1, further comprising using the data processor to operate on the sets of data to re-orient the three-dimensional image.

7. The method of claim 6, wherein the operation to re-orient the three-dimensional image comprises performing a linear transform operation on the first set of data based information provided by a user of the three-dimensional display.

8. The method of claim 1, further comprising using the data processor to operate on the sets of data to re-scale the three-dimensional image.

9. The method of claim 8, wherein the operation to re-scale the three-dimensional image comprises performing a linear transform on the initial data based on information provided by a user of the three-dimensional display.

10. The method of claim 1, wherein generating the plurality of sets of data comprises converting a color for a particular pixel from an initial format to a display format.

11. The method of claim 10, wherein converting the color comprises reducing a number of bits representing a color for the particular pixel in the sets of data relative to a number of bits representing a color for the pixel in the initial data.

12. The method of claim 11, wherein reducing the number of bits representing the color comprises converting the color for the particular pixel from a multi-bit representation to a single bit representation.

13. The method of claim 11, wherein converting the color comprises:
shifting a most significant bit of the plurality of bits into a buffer; and
performing a threshold analysis on the most significant bit.

14. The method of claim 1, wherein generating the sets of data comprises generating the sets of data using a graphics processing unit.

15. The method of claim 14, wherein the graphics processing unit comprises a video card.

16. The method of claim 1, further comprising superimposing a second image on the displayed three dimensional image of using the three dimensional display.

17. The method of claim 16, wherein the second image is a three-dimensional image.

18. The method of claim 17, wherein the second image is a three-dimensional image of the same object based on data from a source different from the source of the initial data.

19. The method of claim 17, wherein the second image is a three-dimensional image of the same object as the displayed image, the second image being generated based on a different set of initial data.

20. The method of claim 16, wherein the second image is a computer-generated icon.

21. The method of claim 1, further comprising operating on the sets of data to re-color at least a portion of the image.

22. The method of claim 1, further comprising adjusting the image in real time based on information provided by a user of the three-dimensional display.

23. The method of claim 1, further comprising:
providing initial data corresponding to the three dimensional image; and
comparing each set of data to a corresponding threshold data structure,
wherein each of some of the threshold data structures is generated based on a transformation of a threshold data structure corresponding to an adjacent data set such that a first threshold data structure used for a data set is uncorrelated to a second threshold data structure used for an adjacent data set, in which the adjacent data set is the data set corresponding to the adjacent intersection of the two dimensional surface with the three dimensional image.

24. The method of claim 23, wherein each threshold data structure comprises a matrix of threshold values.

25. The method of claim 23, wherein a first of the threshold data structures is generated by permutating and negating the matrix elements of the threshold data structure for the adjacent data set.

26. The method of claim 23, wherein each set of data comprises a plurality of elements corresponding to pixels in the three dimensional image, and comparing each set of data to the corresponding threshold data structure comprises determining if a value for a particular pixel in the data set is greater than a value associated with the particular pixel in the associated threshold data structure.

27. The method of claim 1, wherein projecting the images includes projecting the plurality of sets of data in a sequential order for sets of data that represent adjacent sets of data in the three dimensional image of the object.

28. The method of claim 1, wherein the surface is a two dimensional surface.

* * * * *